(12) United States Patent
Tsirkin

(10) Patent No.: US 10,924,505 B2
(45) Date of Patent: Feb. 16, 2021

(54) PASSCODE BASED ACCESS-CONTROL WITH RANDOMIZED LIMITS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 160 days.

(21) Appl. No.: 15/685,061

(22) Filed: Aug. 24, 2017

(65) Prior Publication Data
US 2019/0068633 A1 Feb. 28, 2019

(51) Int. Cl.
*H04L 29/06* (2006.01)

(52) U.S. Cl.
CPC ........ *H04L 63/1441* (2013.01); *H04L 63/083* (2013.01)

(58) Field of Classification Search
CPC ............. G06F 21/31; G06F 2221/2113; G06F 2221/2141; H04L 63/08; H04L 63/083
See application file for complete search history.

(56) References Cited

U.S. PATENT DOCUMENTS

| | | | |
|---|---|---|---|
| 7,865,950 B2 | 1/2011 | Lipetz | |
| 8,499,346 B2 * | 7/2013 | Kilgore | G06F 21/629 726/19 |
| 8,793,509 B1 * | 7/2014 | Nelson | G06F 21/335 380/227 |
| 8,875,258 B2 | 10/2014 | Michener et al. | |
| 9,374,368 B1 * | 6/2016 | Roth | H04L 63/0846 |
| 9,501,635 B2 | 11/2016 | Chinta et al. | |
| 9,558,343 B2 | 1/2017 | Beauregard et al. | |
| 2005/0240987 A1 * | 10/2005 | Taguchi | G06F 21/36 726/1 |
| 2006/0085845 A1 * | 4/2006 | Davis | G06F 21/31 726/6 |
| 2009/0259588 A1 * | 10/2009 | Lindsay | G06Q 20/102 705/40 |
| 2011/0179469 A1 * | 7/2011 | Blinn | G06F 21/41 726/4 |
| 2012/0331534 A1 * | 12/2012 | Smith | G06F 21/41 726/6 |

(Continued)

OTHER PUBLICATIONS

Matt Weir et al., Testing Metrics for Password Creation Policies by Attacking Large Sets of Revealed Passwords, Oct. 2010, ACM, pp. 162-175. (Year: 2010).*

(Continued)

*Primary Examiner* — Luu T Pham
*Assistant Examiner* — Fahimeh Mohammadi
(74) *Attorney, Agent, or Firm* — Lowenstein Sandler LLP

(57) ABSTRACT

Systems and methods for enhancing the security of an account by reducing the ability of an attacker to determine that an account includes multiple passcodes for accessing the account. An example method may comprise: accessing an account that comprises a first passcode providing constrained access to a set of computing resources and a second passcode providing unconstrained access to the set of computing resources; associating the account with a randomized resource limit that restricts a quantity of passcodes associated with the account; receiving a request to create a third passcode for the account; and denying the creation of the third passcode for the account in view of the randomized resource limit.

19 Claims, 6 Drawing Sheets

(56) References Cited

U.S. PATENT DOCUMENTS

| | | | | |
|---|---|---|---|---|
| 2013/0167205 | A1* | 6/2013 | Michener | H04L 9/3226 726/4 |
| 2013/0227680 | A1* | 8/2013 | Pavlyushchik | G06F 21/00 726/21 |
| 2015/0180863 | A1* | 6/2015 | Kobayashi | H04L 63/0807 726/9 |
| 2015/0242604 | A1* | 8/2015 | Brown | G06F 21/45 726/17 |
| 2016/0036806 | A1* | 2/2016 | Aguilar-Macias | G06F 21/41 726/8 |
| 2016/0048440 | A1 | 2/2016 | Williams et al. | |
| 2016/0057619 | A1* | 2/2016 | Lopez | G06F 9/455 380/247 |
| 2016/0164859 | A1* | 6/2016 | Vidal | H04L 51/12 705/37 |
| 2016/0253458 | A1* | 9/2016 | Balwani | H04L 63/083 705/2 |
| 2017/0187697 | A1* | 6/2017 | Li | H04L 67/10 |

OTHER PUBLICATIONS

Benny Pinkas et al., Securing Passwords Against Dictionary Attacks, Nov. 2002, ACM, pp. 161-170. (Year: 2002).*

Shangping Zhong et al., A Novel Distributed Single Sign-On Scheme with Dynamically Changed Threshold Value, Aug. 18-20, 2009, IEEE, pp. 563-566. (Year: 2009).*

Daw-Tung Lin et al., Computer-Access Authentication with Neural Network Based Keystroke Identity Verification, Jun. 12-12, 1997, IEEE, pp. 174-178. (Year: 1997).*

"IAM Best Practices", http://docs.aws.amazon.com/IAM/latest/UserGuide/best-practices.html, 18 pages, Apr. 26, 2017.

Habert, David, "Good Practices for Managing Microsoft Azure Subscriptions", https://blog.kloud.com.au/2013/07/30/good-practices-for-managing-windows-azure-subscriptions/, 12 pages, Apr. 26, 2017.

"Controlling Switch Access with Passwords and Privilege Levels", http://www.cisco.com/c/en/us/td/docs/switches/lan/catalyst3850/software/release/3se/security/configuration_guide/b_sec_3se_3850_cg/b_sec_3se_3850_cg_chapter_011.pdf, 20 pages.

* cited by examiner

US 10,924,505 B2

PASSCODE BASED ACCESS-CONTROL WITH RANDOMIZED LIMITS

TECHNICAL FIELD

The present disclosure is generally related to account management features for controlling access to computing resources, and more particularly, to a security enhanced account with multiple login passcodes.

BACKGROUND

Modern computer systems often include account management and access-control features that enable a computer system to share computing resources among multiple different accounts. Each of the accounts may correspond to a particular entity, such as a user or computer, which consumes computing resources. The account management features may store details for each of the accounts and may request that an entity provide or verify the account details in order to access the resources. In a traditional computing environment, the account details may include account credentials that include an account identifier and password. An entity may provide the account identifier and password to authenticate with the account management features. Once an entity is authenticated, the access-control features may control access to the computing resources, enforce policies, audit usage, and provide information about the computing resources to the entity. Securing account details and limiting the access of the accounts help enhance security of the computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
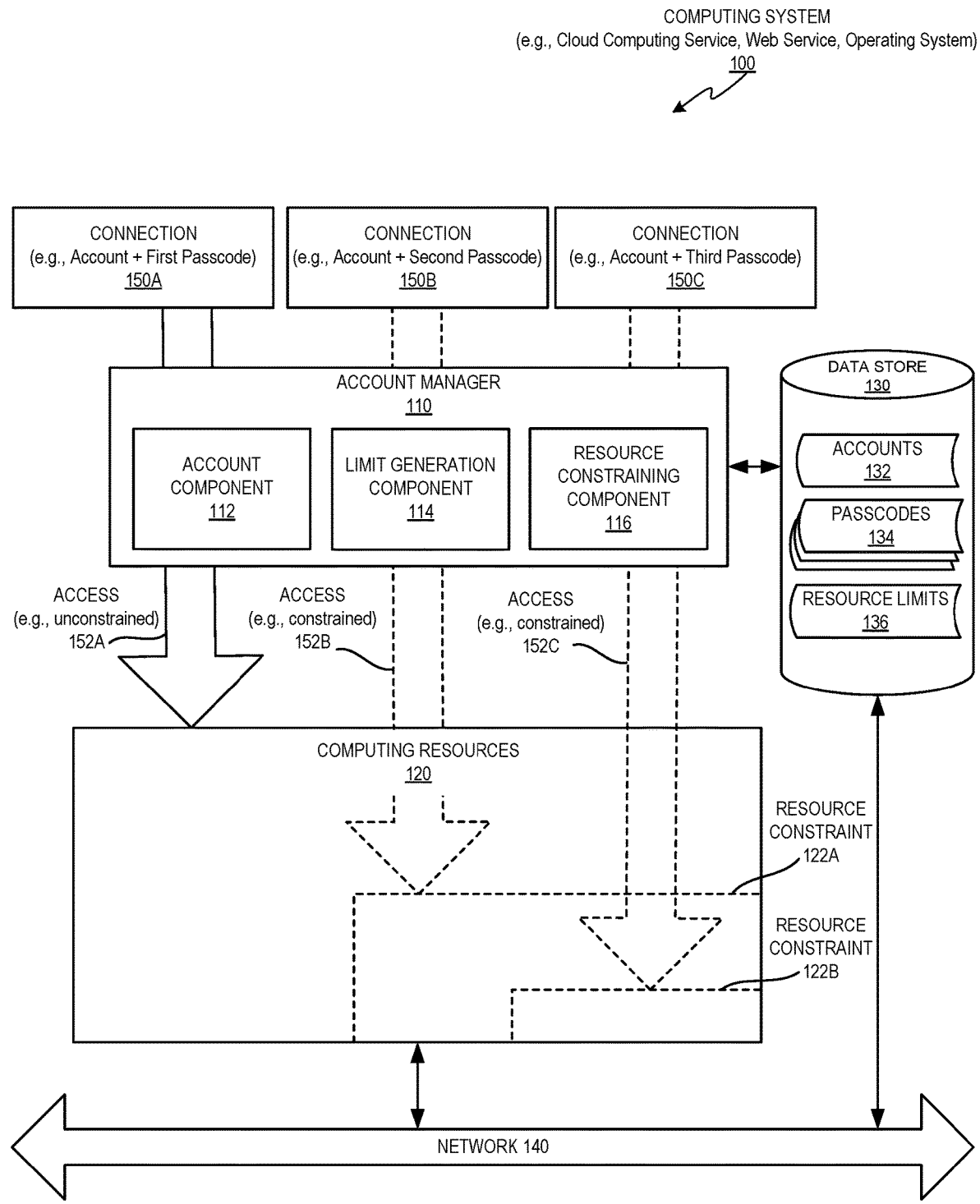
FIG. 1 depicts a high-level block diagram of an example computer system architecture that enhances the security of accounts that have multiple passcodes, in accordance with one or more aspects of the present disclosure.

Computer systems often include security features to mitigate security vulnerabilities related to account access. Some security features may involve reducing the probability that an account will be compromised. For example, a security feature may encrypt the transfer or storage of account credentials. Other security features may involve reducing the threat posed by an account that is compromised. In one example, the threat of an account can be reduced by associating the account with multiple passcodes that have different levels of access. When a user is logging in from an unfamiliar machine or on an unsecured network, the user may use a passcode with a lower level of access. If the account is compromised, it may only comprise the passcode with the lower level of access and the resources available at a higher access level may remain protected.

Having an account with multiple passcodes may be effective against security attacks involving advanced persistent threats. An advanced persistent threat is a type of stealthy and continuous internet-enabled espionage that uses a variety of intelligence gathering techniques to access sensitive information. An advanced persistent threat may involve malicious executable code (e.g., malware) that attempts to compromise an account by determining the passcode of the account. This may involve key logging, passcode cracking, other techniques, or a combination thereof. Once the malicious executable code obtains the passcode of an account, it may continue to another account or to another task that involves monitoring the activity of the account or using the account to inspect computing resources. An account with multiple passcodes may subvert the malicious executable code by including a more easily obtainable passcode (e.g., simple password) that may function as a dummy passcode with superficial access (e.g., ability to login but no access to confidential data). The dummy passcode may be determined by the malicious executable code and may mislead the malicious executable code into determining that it has successfully compromised the account when in fact the account includes another passcode that provides non-superficial access (e.g., access to confidential data).

Some advanced persistent threats are more sophisticated and may include attack techniques that detect when an account has multiple passcodes. In one example, the attack techniques may involve analyzing public or proprietary configuration information to determine the maximum number of passcodes a compromised account can have. Once the maximum number is known, the malware may attempt to create additional passcodes using the compromised account and deduce whether another passcode exists. For example, if the account is known to support up to ten passcodes, the malware may attempt to create additional accounts until it is denied. If the malware was able to create only five new passcodes, then it can deduce that four other passcodes exist. In another example, the attack technique may involve analyzing the amount of available computing resources associated with a compromised account and comparing the amount to the expected amount for the account. For example, if the compromised account is expected to have a certain amount of storage space (e.g., memory or disk storage), network bandwidth, processing power, input and output (I/O), other computing resource, or a combination thereof and the amount available is only half of the expected amount then the malware may deduce that at least one other passcode exists for the account. In either situation, when the malware determines there is another passcode it may continue its attack until the other passcode is obtained.

Aspects of the present disclosure address the above and other deficiencies by varying limits for accounts with multiple passcodes. In one example, account management features of a computing system may support an account that has multiple passcodes. Each passcode may be a bit sequence for authenticating an account and may include a password, access code, token, other bit sequence, or a combination thereof. The passcodes may provide different levels of access to computing resources. For example, a first passcode may provide unconstrained access to the computing resources and a second passcode may provide constrained access to the computing resources. Constrained access may be any modification (e.g., restriction) of an account's access to one or more of the computing resources. Access that is constrained may involve hiding a portion of the computing resources (e.g., hiding confidential data), altering access to computing resource (e.g., decreasing storage, bandwidth, memory, or processing power), changing privileges with respect to a computing resource (e.g., reducing data access to only read-only), or a combination thereof. In one example, the account management features may associate the account with a randomized resource limit that restricts a quantity of passcodes associated with the account. The randomized resource limit may vary unpredictably for each account. In one example, the account management features may randomly generate the limits using a random value generator. In another example, the account management features may randomly assign or associate a previously generated value to the account or to a particular passcode of the account. The account management features may subsequently receive a request to create an additional passcode for the account and may deny the creation of the passcode in view of the randomized resource limit.

The systems and methods described herein include technology to enhance the security of accounts with multiple passcodes. In particular, aspects of the present disclosure may reduce the ability of an attacker to discover that a compromised account has another passcode (e.g., has multiple passcodes). This may occur because the limits associated with the account may be randomized and an attacker may no longer be able to deduce that there is another passcode just because the passcode creation failed. Aspects of the present disclosure may be performed on any computing system. In one example, the technology may be used with a web service or cloud based service that provides access to remote resources. The service may provide cloud computing, remote storage, email, calendar, other service, or a combination thereof. In another example, the technology may be used to enhance an operating system (e.g., desktop computer) that accesses local or remote resources.

Various aspects of the above referenced methods and systems are described in details herein below by way of examples, rather than by way of limitation. The examples provided below discuss a computing system that executes multiple concurrent connections. In other examples, separate computing systems may be used to execute one or more of the connections concurrently or non-concurrently.

FIG. 1 depicts an illustrative architecture of elements of a computing system 100, in accordance with an embodiment of the present disclosure. It should be noted that other architectures for computing system 100 are possible, and that the implementation of a computing system utilizing embodiments of the disclosure are not necessarily limited to the specific architecture depicted. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. Computing system 100 may provide account management features for a cloud computing service, a web service, an operating system, other computing system, or a combination thereof. In the example shown in FIG. 1, computing system 100 may include account manager 110, computing resources 120, a data store 130, and a network 140.

Account manager 110 may be a portion of computing system 100 that manages one or more accounts 132 and the access of accounts 132 to computing resources 120. Computing resources 120 may include any resource of a computing system and may include data resources such as file system objects (e.g., files, directories), database objects (e.g., records, tables), processing resources (e.g., processor cycles), networking resources (e.g., bandwidth), storage resources (e.g., memory or disk space), account configuration resources (e.g., number of account passwords), other resources, or a combination thereof. Accounts 132 may represent entities and may enable the entities to access computing resources 120. Accounts 132 may correspond to one or more users, computing devices, other entities, or a combination thereof. Accounts 132 may include local accounts that are specific to a computing system 100 or may include shared accounts that are shared between multiple computing systems. Accounts 132 may be represented by one or more data structure within data store 130. The data structures may store and organize account data for the one or more entities. The account data may include account credentials, account settings, other data, or a combination thereof. In the example shown in FIG. 1, account manager 110 may include an account component 112, a limit generation component 114, and a resource constraining component 116.

Account component 112 may receive account credentials from an entity and may handle authenticating the entity with computing system 100. Each account may be associated with one or more passcodes and account component 112 may enable the creation of additional accounts or additional passcodes for each of the accounts. An account with multiple passcodes may be configured to provide the same or different access to computing resources 120 depending on which passcode is used for authentication. The different access may be based on one or more resource constraints 122A and 122B that are associated with respective passcodes. Resource constraints 122A and 122B may be any restriction to computing resources 120 and may involve hiding a portion of computing resources 120 (e.g., hiding confidential data), altering access to computing resource 120 (e.g., decreasing storage, bandwidth, memory, or processing power), changing privileges with respect to computing resource 120 (e.g., reducing data access to only read-only), or a combination thereof.

Limit generation component 114 may generate limits that apply to an account and may limit actions performed by the account or the amount of computing resources allocated to the account. The limits may be enforced by access-control features of account manager 110 and may apply to computing threads (e.g., executable processes) that are associated with an account. The limits may affect a quantity of computing resources 120 associated with an account or with a particular passcode. In one example, the limits may restrict the ability of an account to create an additional passcode for itself. The limits may be randomized and vary unpredictably between different accounts or between different passcodes of an account. In one example, the randomized resource limits may include randomly generated values that are generated on behalf of account manager 110 or other portion internal or external to computing system 100. The randomly generated values may be pseudo random values that are generated by a random number generator. In another example, the randomized resource limits may be preexisting values (e.g., numeric or non-numeric values) of a set that are randomly assigned to a particular account or a particular passcode. The generation or assignment of the randomized resource limits may occur before, during, or after an account or passcode is created. Having randomized resource limits may be advantageous because it may make it challenging for an attacker to predict the limit and deduce whether an account has multiple passcodes. The limits may include resource limits 136, other limits, or a combination thereof, which are discussed in more detail in regards to FIG. 2.

Resource constraining component 116 may access the information of account component 112 and use this information to constrain access of an account to computing resources 120 depending on which passcode is used during authentication. As discussed above, an account may be associated with multiple passcodes and each passcode may correspond to a respective set of account credentials. The sets of account credentials may be authenticated using account manager 110 and may cause account manager 110 to initiate connections 150A-C.

Connections 150A-C may be interactive information exchanges between a computing thread of an entity and computing system 100. The exchange may involve one or more messages between one or more communication devices. Each connection may be based on a particular set of account credentials (e.g., a particular passcode) and actions performed using the connection may be attributed to the account credentials and limited by data associated with the account credentials. In one example, the connection may be between a user device (e.g., client device) executing one or more computing threads and one or more cloud or web based services (e.g., server device). In another example, the connection may be between a user and a single computer device (e.g., operating system of a client or server device executing one or more computing threads). Each of the connections 150A-C may be based on the same account but may each correspond to a different passcode of the account. For example, connection 150A may correspond to a particular account identifier and a first passcode, and connections 150B and 150C may correspond to the same account identifier but to the second and third passcodes respectively.

Resource constraining component 116 may include access-control functionality and may constrain the access of connections 150A-C to computing resources 120. As shown by access 152A-C, each connection may correspond to a different passcode and may have different access to computing resources 120. Constraining access of a connection may involve restricting what a computing thread can access using the connection. The constrained access may be based on one or more resource constraints (e.g., resource constraints 122A and 122B) associated with the respective passcode. Access that is constrained may involve hiding a portion of the computing resources (e.g., hiding confidential data), altering access to computing resource (e.g., decreasing storage, bandwidth, memory, or processing power), changing privileges with respect to a computing resource (e.g., reducing data access to only read-only), or a combination thereof. Each account may include a passcode that is unconstrained and the unconstrained passcode may provide a computing thread with the maximum amount of privileges available to account as shown by connection 150A. In contrast, access 152B and 152C may be examples of constrained access and may be restricted by resource constraints 122A and 122B.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
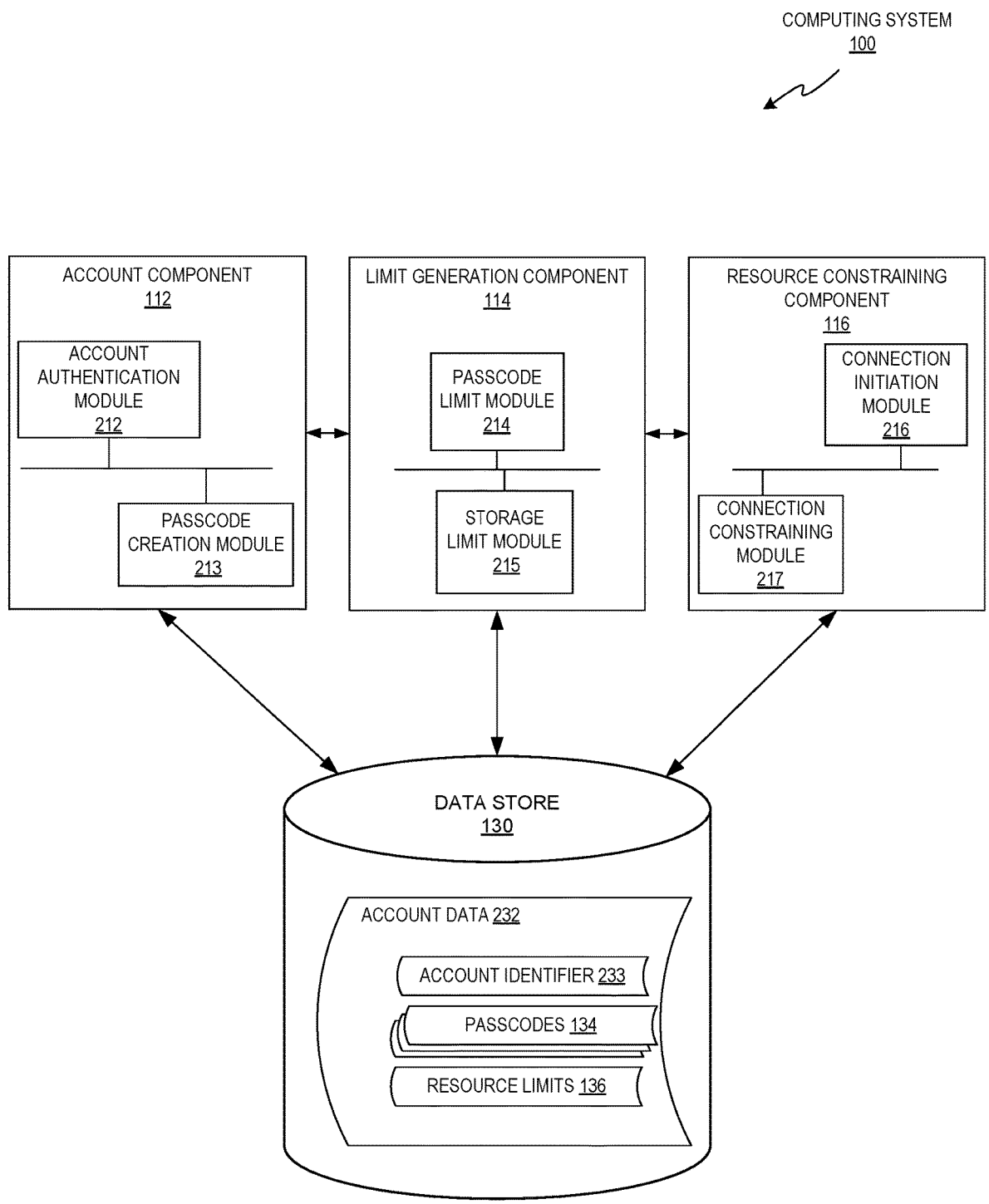
FIG. 2 depicts a block diagram illustrating components and modules of an example computing system, in accordance with one or more aspects of the present disclosure.

FIG. 2 depicts a block diagram illustrating an exemplary computing system 100 with technology that enhances the security of accounts with multiple passcodes, in accordance with aspects of the disclosure. Computing system 100 may be the same or similar to computing system 100 of FIG. 1 and may include an account component 112, a limit generation component 114, and a resource constraining component 116. More or less components or modules may be included without loss of generality. For example, two or more of the components may be combined into a single component, or features of a component may be divided into two or more components. In one implementation, one or more of the components may reside on different computing devices (e.g., a client device and a server device).

Account component 112 may be a portion of the computing system 100 that manages account data 232 for one or more accounts. Account data 232 may include the settings for an account and may store profile data. The profile data may identify configuration data for the account and identify computing resources and privileges associated with the account. The profile data may also include references (e.g., links) to one or more groups, users, or computing devices that are associated with the account. The account may be a user account, computing device account, other account, or a combination thereof. The account may have an account type or category such as a guest, user, or administrator that corresponds to a default set of access and privileges that may or may not be customized. Each account may be associated with one or more passcodes and account component 112 may enable the creation of accounts as well as the creation of one or more passcodes for each of the accounts. An account with multiple passcodes may be configured to provide the same or different access to computing resources 120 depending on which passcode is used for authentication. In the example shown in FIG. 2, account component 112 may include an account authentication module 212 and a passcode creation module 213.

Account authentication module 212 may receive account credentials from an entity and may handle authenticating the entity with computing system 100. The account credentials may include an account identifier 233 and one or more of the passcodes 134. The account identifier 233 and passcodes 134 may be in any form and may include textual data (e.g., numeric, alpha-numeric, character data, binary data), audio data (e.g., spoken utterance), image data (e.g., facial scan, gesture recognition), tactile data (e.g., finger print), other data, or a combination thereof. The account identifier may uniquely identify an account and may include a user identifier (e.g., user name), a computer identifier (e.g., computer name), a domain identifier (e.g., domain name), a token (e.g., Security Identifier Structure (SID)), other identifier, or a combination thereof. Each passcode of the one or more passcodes 134 may be a bit sequence that is used for authenticating an entity as an account holder and may be based on any of the forms discussed above. For example, the passcode may be password, personal identification number (PIN), key, certificate, other bit sequence, or a combination thereof. In one example, the account credentials may include an account identifier 233 and a single passcode. In another example, the account credentials may include account identifier 233 and multiple passcodes (e.g., dual authentication).

Passcode creation module 213 may enable account component 112 to add a passcode to an existing account. An account may be authorized to add passcodes to another account or to its own account. In one example, there may be an account with enhanced privileges (e.g., administrator account) that is authorized to create another account and to add one or more passcodes to the other account. In another example, an account may be restricted from creating additional accounts but may be authorized to add additional passcodes to its own account. In either example, each of the passcodes added to an account may be used to authenticate the account. The passcodes of an account may be related to one another and may allow for shared access to some or all of the computing resources. In one example, a computing thread may establish a connection based on a first passcode (e.g., parent passcode) and may cause passcode creation module 213 to create a second passcode (e.g. child passcode). The second passcode may function as a sub passcode and may inherit the access available to the first passcode or may be provided a subset of the access available to the first passcode (e.g., constrained access). A connection based on the second passcode may then be used to cause passcode creation module 213 to create a third passcode and so on to create nested passcodes.

Limit generation component 114 may enable computing system 100 to generate and store limits that affect different aspects of an account. Some limits affect the amount of resources (e.g., number of passcodes, storage space) that can be accessed or created. The limits may apply to a particular passcode (e.g., an account connection), to a particular account (e.g., all account connections), to a group of accounts, or a combination thereof. The limits may be inaccessible to a computing thread that is using the connection yet may function to limit what the computing thread is able to perform using the connection. For example, a computing thread using a connection with constrained access may not be aware of a limit adversely affecting the connection but may nonetheless be restricted based on the limit. The computing thread using the connection may be unaware that the limit exists or may be aware the limit exists but unaware of the boundaries of the limit (e.g., numeric value of the limit). The limit may also vary unpredictably or randomly between different accounts and passcodes. This may be advantageous because if a computing thread using the connection is aware of a limit imposed on a particular account or passcode it may use this to deduce the existence of other passcodes as discussed above. In the example shown in FIG. 2, limit generation component 114 may include a passcode limit module 214 and a storage limit module 215.

Passcode limit module 214 may generate and store resource limits 136 that indicate a maximum number of passcodes that can be associated with an account. The number of passcodes that can be associated with an account is a form of a computing resource and some accounts or particular passcodes may be able to create more or less passcodes then others. An attempt to create an additional passcode for an account that exceeds resource limit 136 may result in a denial signal. The denial signal may comprise a failure, error message, or other signal. The denial signal may indicate a limit exists and that the limit has been reached without providing the numeric value of the limit. The denial signal may also or alternatively provide a generic signal that indicates the creation failed without indicating a limit exists.

Storage limit module 215 may generate and store resource limits 136 that indicate the amount of access an account or a passcode of the account has to other computing resources. Resource limits 136 may include one or more limits for constraining access and may apply to a particular passcode, or a particular account (e.g., all passcodes within the account), or a combination thereof. The one or more limits may apply to any of the computing resources and may include limits to the creation or access of data resources such as file system objects (e.g., files, directories), database objects (e.g., records, tables), processing resources (e.g., processor cycles), networking resources (e.g., network bandwidth), storage resources (e.g., memory or disk space), input and output (TO) (e.g., memory TO, disk TO), other resources of a computing system, or a combination thereof.

Resource constraining component 116 may establish connections and constrain the connections in view of account data 232 and the one or more limits generated by limit generation component 114. In the example shown in FIG. 2, resource constraining component 116 may include a connection initiation module 216 and a connection constraining module 217.

Connection initiation module 216 may initiate and establish a connection based on an authenticated set of account credentials. A connection may be established (e.g., set-up) at a particular point in time and may involve a semi-permanent (e.g., temporary) or permanent (e.g., persistent) connection that may or may not be terminated at a subsequent point in time. An established connection may be an example of a connection-oriented communication and may involve more than one message in each direction and may be stateful or stateless. A stateful connection involves a device (e.g., client or server device) storing information about the connection history in order to be able to communicate. A stateless connection may involve a communication that consists of independent requests with corresponding responses. In one example, connections 150A-C may be login session where a particular entity logs into a service (e.g., signs-in) and is subsequently logged out of the service (e.g., signed-out). In another example, connection 150A-C may be network connection such as a Hyper Text Transfer Protocol (HTTP) connections, Transport Connection Protocol (TCP) connections, other connections, or a combination thereof. The connections may be implemented as part of protocols and services at the application layer, at the session layer, at the transport layer, or at any other layer of the Open Systems Interconnection (OSI) model.

Connection constraining module 217 may constrain access provided to a computing thread over the connection based on one or more resource constraints. Constrained access may be any modification (e.g., restriction) of an account's access to one or more of the computing resources. This may involve hiding a portion of the computing resources (e.g., hiding confidential data), altering access to computing resource (e.g., decreasing storage, bandwidth, memory, or processing power), changing privileges with respect to a computing resource (e.g., reducing data access to only read-only). In contrast, unconstrained access may be the maximum amount of access available to an account.

Figure 3:
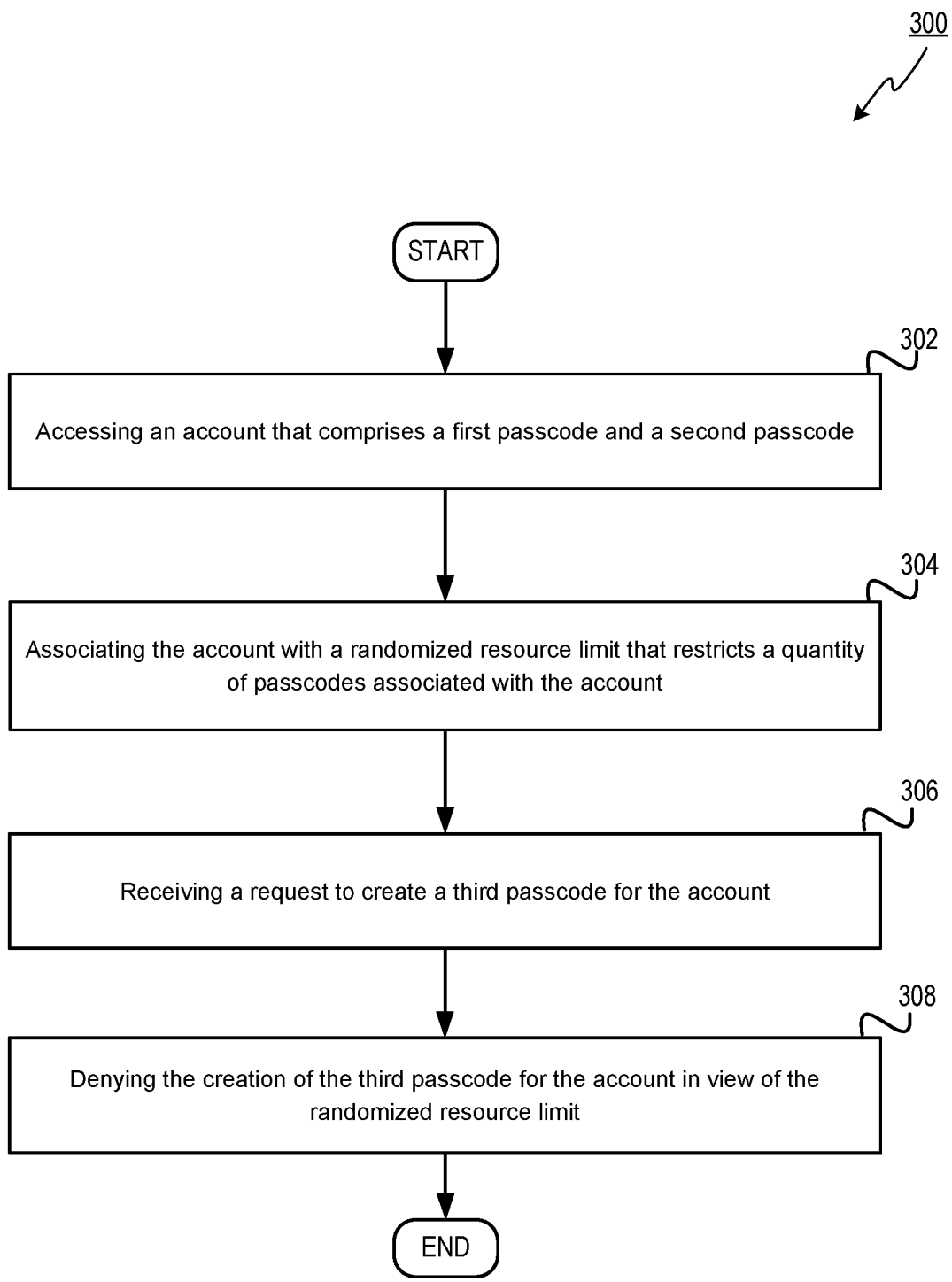
FIG. 3 depicts a flow diagram of an example method for enhancing the security of accounts that have multiple passcodes, in accordance with one or more aspects of the present disclosure.
Figure 4:
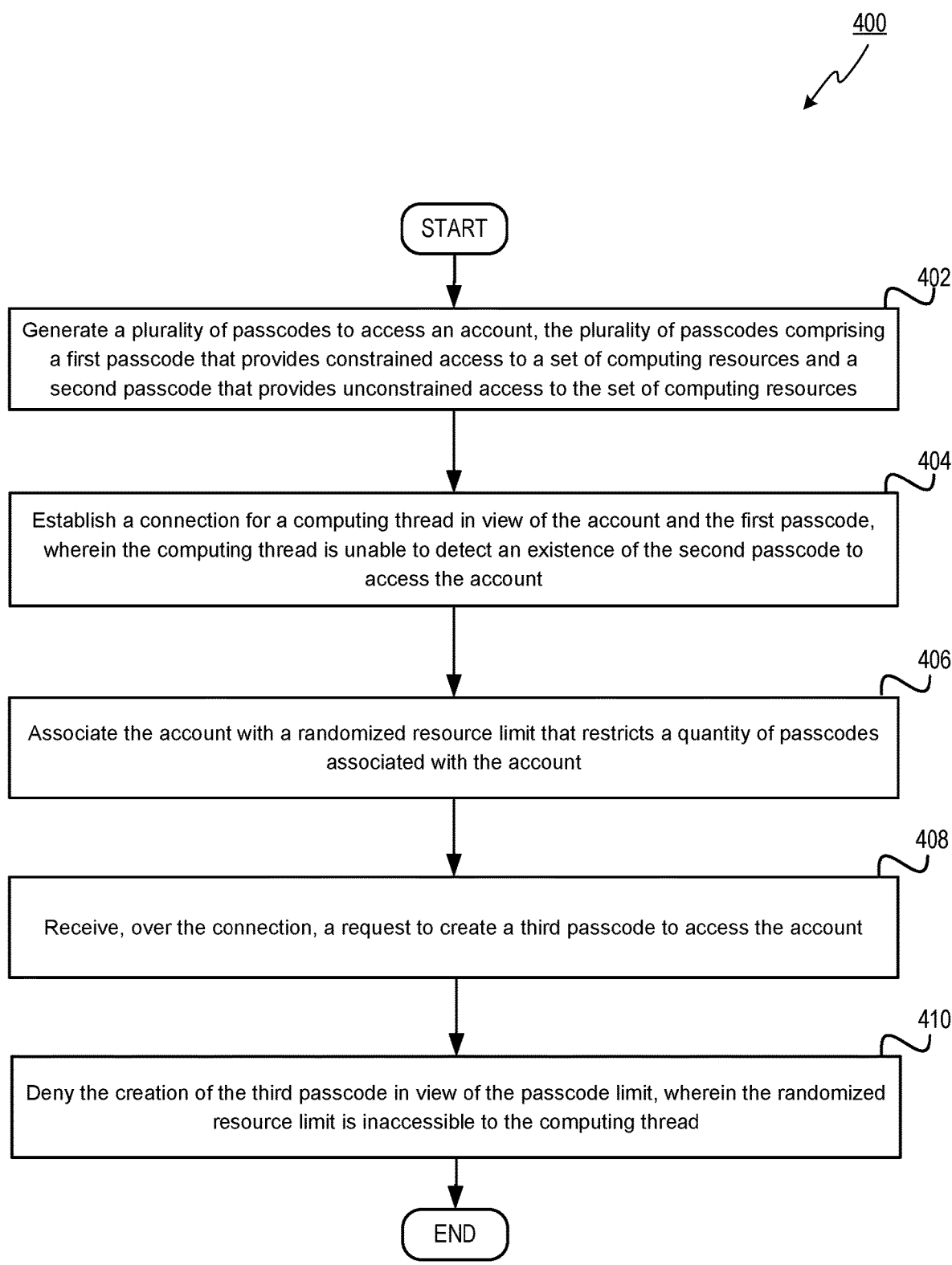
FIG. 4 depicts a flow diagram of another example method for enhancing the security of accounts with multiple passcodes, in accordance with one or more aspects of the present disclosure.

FIGS. 3 and 4 depict flow diagrams for illustrative examples of methods 300 and 400 in accordance with aspects of the disclosure. Method 300 illustrates an example process flow for enhancing the security of accounts with multiple passcodes and method 400 is an example process flow for enhancing the security of an account by enabling the account to be used with multiple passcodes for establishing multiple connections. Methods 300 and 400 may be performed by processing devices that may comprise hardware (e.g., circuitry, dedicated logic, programmable logic, microcode, etc.), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing system that manages a web service, cloud computing service, an individual operating system, other executable code, or a combination thereof.

Referring to FIG. 3, method 300 may be performed by processing devices of a server device or a client device and may begin at block 302. At block 302, the processing device may access an account that comprises a first passcode and a second passcode. The first passcode may provide constrained access to a set of computing resources and the second passcode may provide unconstrained access to the same set of computing resources. The constrained access may be any modification (e.g., restriction) of an account's access to one or more of the computing resources. This may involve hiding a portion of the computing resources (e.g., hiding confidential data), altering access to computing resource (e.g., decreasing storage, network bandwidth, memory, or processing power), changing privileges with respect to a computing resource (e.g., reducing data access to read-only), etc. In contrast, unconstrained access may be the maximum amount of access available to the account and may be greater than the constrained access.

The processing device may establish the first connection and the second connection in view of multiple passcodes of the same account. The first connection and the second connection may each comprise a login session for at least one of a web service, an operating system, or an application. The first connection may be based on the first passcode and be associated with constrained access to the set of computing resources. The second connection may be based on the second passcode and be associated with unconstrained access to the same set of computing resources. In one example, the set of computing resources may include a computing resource that is hidden from the first connection having the constrained access and is accessible to the second connection having the unconstrained access. A computing thread using the connection associated with the constrained access may be unable to detect that the access to the set of computing resources is constrained and may be unable to detect an existence of another passcode for the account (e.g., existence of the second passcode).

At block 304, the processing device may associate the account with a randomized resource limit (e.g., a maximum number of passcodes) that restricts a quantity of passcodes associated with the account. The randomized resource limit may restrict the quantity of passcodes associated with the account and may include a random limit that is unavailable to a computing thread using the connection. In one example, the randomized resource limit may include a first limit that restricts a first computing resource involving the quantity of passcodes associated with the account and may include a second limit that restricts a quantity of a second computing resource. The second computing resource may be an amount of storage space, processing power, or network bandwidth. The first and second limits may be randomly generated values or they may be preexisting values that are randomly associated or assigned to the particular account or passcode (e.g., first passcode).

At block 306, the processing device may receive a request to create a third passcode for the account. In one example, the first passcode providing the constrained access and the second passcode comprising the unconstrained access may each enable a respective computing thread to request a creation of an additional passcode. The multiple passcodes may provide nested levels of constrained access wherein the first passcode provides access at a first level, the second passcode provides access at a second level, and the third passcode provides access at a third level. The first level may have the broadest access (e.g., unconstrained access) and each of the subsequent levels may have successively narrower access (e.g., constrained access).

At block 308, the processing device may deny the creation of the third passcode for the account in view of the randomized resource limit. Attempts to create passcodes for an account in excess of the randomized resource limit may result in a denial, failure, error, or other signal. In one example, the processing device may establish a connection comprising constrained access in view of the account. The processing device may receive, over the connection and from a computing thread, a request to create a passcode for the account. The processing device may deny the request and the computing thread may be unable to determine the value for the randomized resource limit. For example, the computing thread may be unable to distinguish between a denial that occurred because the randomized resource limit is set to one and there is already one passcode or the randomized resource limit is set to a value greater than one and there exists multiple other passcodes. Therefore an attacker (e.g., malicious computing thread) that detected a passcode of the account, may be unable to deduce whether another passcode exists. This may result in the attacker terminating its passcode detection techniques after detecting only one of the account passcodes. Responsive to completing the operations described herein above with references to block 308, the method may terminate.

Referring to FIG. 4, method 400 may be performed to enhance the security of an account by enabling the account to be used with multiple passcodes, wherein at least one of the passcodes can be used to establish a connection associated with constrained access. Method 400 may be performed by processing devices of a server device or a client device and may begin at block 402.

At block 402, the processing device may generate a plurality of passcodes to access an account. The plurality of passcodes may include a first passcode that provides constrained access to a set of computing resources and a second passcode that provides unconstrained access to the set of computing resources. The constrained access may be any modification (e.g., restriction) of an account's access to one or more of the computing resources. This may involve hiding a portion of the computing resources (e.g., hiding confidential data), altering access to computing resource (e.g., decreasing storage, network bandwidth, memory, or processing power), changing privileges with respect to a computing resource (e.g., reducing data access to read-only), etc. In contrast, unconstrained access may be the maximum amount of access available to the account and may be greater than the constrained access.

At block 404, the processing device may establish a connection for a computing thread in view of the account and the first passcode. The computing thread using the connection may be unable to detect an existence of the second passcode for the account. In one example, the processing device may establish a first connection and a second connection in view of multiple different passcodes of the same account. The first connection and the second connection may each comprise a login session for at least one of a web service, an operating system, or an application. The first connection may be based on the first passcode and may be associated with constrained access to the set of computing resources. The second connection may be based on the second passcode and may be associated with unconstrained access to the set of computing resources. In one example, the set of computing resources may include a computing resource that is hidden from a computing thread using the connection associated with the constrained access and is accessible to a computing thread using the second connection associated with the unconstrained access.

At block 406, the processing device may associate the account with a randomized resource limit (e.g., a maximum number of passcodes) that restricts a quantity of passcodes associated with the account. The randomized resource limit may restrict the quantity of passcodes associated with the account and may include a random limit that is unavailable to a computing thread using the connection. In one example, the randomized resource limit may include a first limit that restricts a first computing resource involving the quantity of passcodes associated with the account and may include a second limit that restricts a quantity of a second computing resource. The second computing resource may be an amount of storage space, processing power, or network bandwidth. The first and second limits may be randomly generated values or they may be preexisting values that are randomly associated or assigned to the particular account or passcode (e.g., first passcode).

At block 408, the processing device may receive, over the connection, a request to create a third passcode to access the account. In one example, each of the first passcode and the second passcode may permit the respective connection to request a creation of an additional passcode. The multiple passcodes may provide nested levels of constrained access wherein the first passcode provides access at a first level, the second passcode provides access at a second level, and the third passcode provides access at a third level. The first level may have the broadest access (e.g., unconstrained access) and each of the subsequent levels may have successively narrower access (e.g., constrained access).

At block 410, the processing device may deny the creation of the third passcode in view of the randomized resource limit. The randomized resource limit may be inaccessible to the computing thread using the connection but attempts by the computing thread to create passcodes for an account in excess of the randomized resource limit may result in a denial, failure, error, or other signal. In one example, the processing device may establish a connection comprising constrained access in view of the account. The processing device may receive, from the computing thread, a request to create a passcode for the account. The processing device may deny the request and the computing thread may be unable to determine the value for the randomized resource limit. For example, the computing thread may be unable to distinguish between a denial that occurs because the randomized resource limit set is set to one and there is already one passcode or the randomized resource limit is set to a value greater than one and there are multiple other passcodes. Therefore an attacker executing a malicious computing thread that compromises (e.g., cracks) a passcode of the account may not be able to deduce whether another passcode exists. This may result in the attacker terminating its passcode detection techniques after obtaining only one of the account passcodes. Responsive to completing the operations described herein above with references to block 410, the method may terminate.

Figure 5:
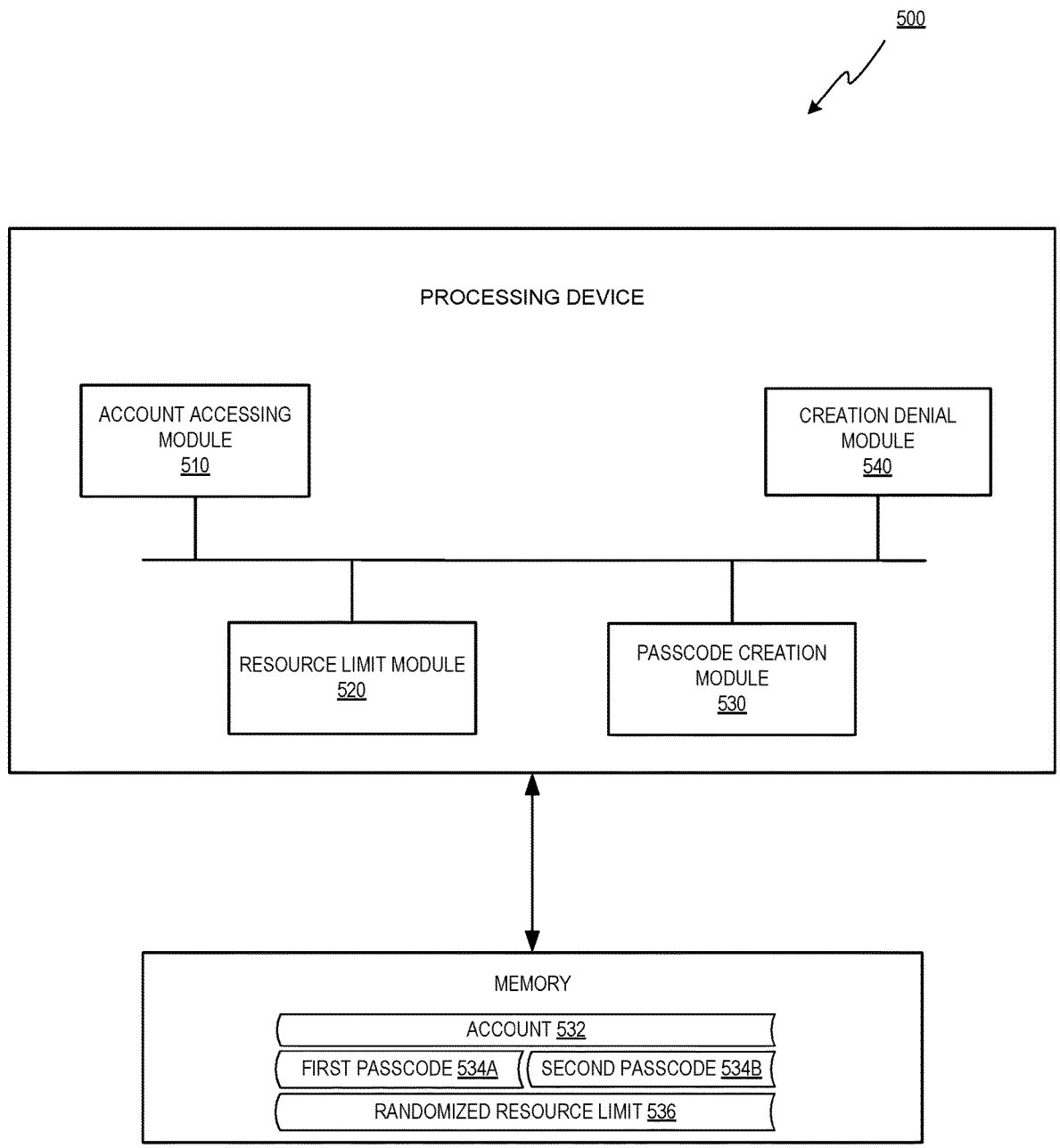
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computing system 100 of FIGS. 1 and 2 and may include one or more processing devices and one or more memory devices. In the example shown, computer system 500 may include an account accessing module 510, a resource limit module 520, a passcode creation module 530, and a creation denial module 540.

Account accessing module 510 may enable the processing device to access an account 532 that comprises a first passcode 534A providing constrained access to a set of computing resources and a second passcode 534B providing unconstrained access to the set of computing resources. Constrained access may be any modification (e.g., restriction) of an account's access to one or more of the computing resources. This may involve hiding a portion of the computing resources (e.g., hiding confidential data), altering access to computing resource (e.g., decreasing storage, network bandwidth, memory, or processing power), changing privileges with respect to a computing resource (e.g., reducing data access to read-only). In contrast, unconstrained access may be the maximum amount of access available to the account and may be greater than the constrained access.

The processing device may establish a first connection and a second connection in view of multiple passcodes of the same account. The first connection and the second connection may each comprise a login connection of a web service, an operating system, or an application. The first connection may be based on first passcode 534A and be associated with constrained access to the set of computing resources. The second connection may be based on second passcode 534B and be associated with unconstrained access to the set of computing resources. In one example, the set of computing resources may include a computing resource that is hidden from the first connection comprising the constrained access and is accessible during the second connection associated with the unconstrained access. A computing thread using the connection associated with the constrained access may be unable to detect that the access to the set of computing resources is constrained and may be unable to detect an existence of another passcode for the account (e.g., existence of the second passcode).

Resource limit module 520 may enable the processing device to associate the account with a randomized resource limit 536 that restricts a quantity of passcodes associated with the account. Randomized resource limit 536 may restrict the quantity of passcodes associated with the account and may include a random limit that is unavailable to a computing thread using the connection. In addition to randomized resource limit 536, the account may also be associated with a resource limit that restricts an amount of computing resources associated with a connection. The resource limit may comprise a randomly generated limit that varies between different accounts.

Passcode creation module 530 may enable the processing device to receive a request to create a third passcode for the account. In one example, first passcode 534A providing the constrained access and second passcode 534B providing the unconstrained access may enable a respective computing thread to request a creation of an additional passcode. The multiple passcodes may provide nested levels of constrained access wherein first passcode 534A provides access at a first level, second passcode 534B provides access at a second level, and a potential third passcode may provide access at a third level. The first level may have the broadest access (e.g., unconstrained access) and each of the subsequent levels may have successively narrower access (e.g., constrained access).

Creation denial module 540 may enable the processing device to deny the creation of the third passcode for the account in view of randomized resource limit 536. Attempts to create passcodes for an account in excess of the randomized resource limit may result in a denial, failure, error, or other signal. In one example, the processing device may establish a connection associated with constrained access in view of the account. The processing device may receive, over the connection and from a computing thread, a request to create a passcode for the account.

The processing device may deny the request but the computing thread may be unable to distinguish between a randomized resource limit set to one or a randomized resource limit set to a value greater than one but with corresponding passcodes. Therefore an attacker that detected a passcode of the account may not be able to deduce whether another passcode exists and may therefore conclude its passcode detection after detecting only one of the account passcodes.

Figure 6:
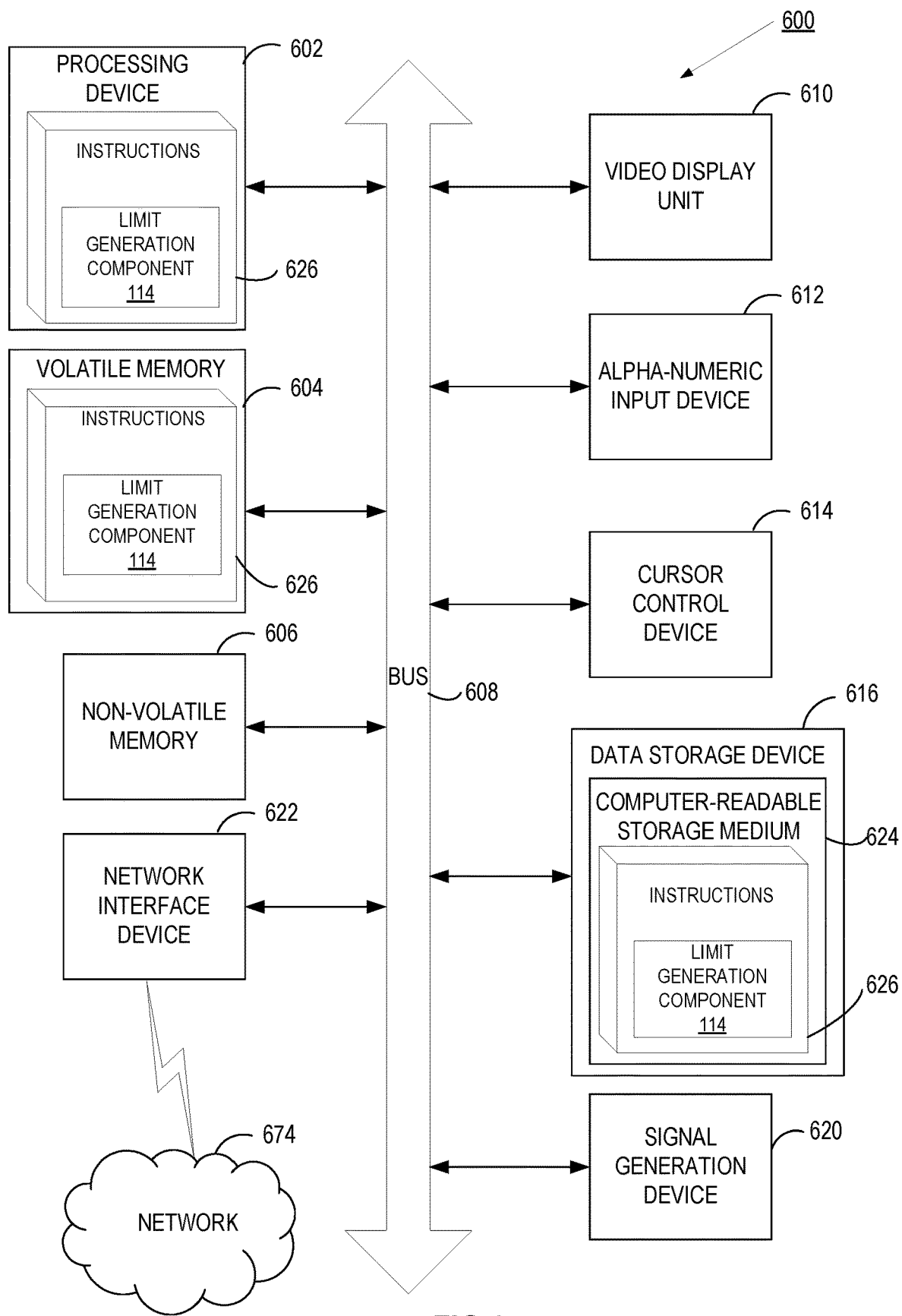
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing system 100 of FIGS. 1 and 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 and for encoding limit generation component 124 of FIGS. 1 and 2.

Instructions 626 may also reside, completely or partially, within volatile memory 604 and/or within processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   accessing an account that is associated with a set of computing resources and comprises a first passcode and a plurality of second passcodes, wherein the account is associated with a limit to a number of passcodes and wherein the first passcode enables access to the set of computing resources and wherein the plurality of second passcodes enable constrained access to the set of computing resources;
   associating, by a processing device, the plurality of second passcodes with respective randomized resource limit that restrict a number of sub passcodes that can be created, wherein the respective randomized resource limit comprise different values that are each less than the limit for the account;
   receiving a first request to create a sub passcode, wherein the first request is associated with one of the second passcodes having constrained access;
   denying the first request in response to a first attempt to create the sub passcode associated with one of the second passcodes in excess of the respective randomized resource limit;
   receiving, from a computing thread, a second request to create a passcode for the account; and
   denying the second request to create the passcode in response to a second attempt to create the passcode for the account in excess of the respective randomized resource limit, wherein the computing thread is unable to determine a value for the respective randomized resource limit.

2. The method of claim 1, further comprising, establishing a first connection and a second connection in view of the account, wherein the first connection is in view of the first passcode and is associated with unconstrained access to the set of computing resources and wherein the second connection is in view of one of the second passcodes and is associated with constrained access to the set of computing resources.

3. The method of claim 2, wherein the first connection and the second connection each comprise a login session for at least one of a web service, an operating system, or an application.

4. The method of claim 2, wherein the set of computing resources comprises a computing resource that is hidden from the second connection associated with the constrained access and is accessible to the first connection associated with the unconstrained access.

5. The method of claim 1, wherein the first passcode and the plurality of second passcodes enable a respective computing thread to request a creation of an additional passcode.

6. The method of claim 1, further comprising:
   receiving, from a computing thread, a request to establish a connection using one of the second passcodes, wherein the computing thread comprises malicious code; and
   establishing a connection for the computing thread, wherein the computing thread is unable to detect that access to the set of computing resources is constrained and is unable to detect an existence of another passcode for the account.

7. The method of claim 1, wherein the respective randomized resource limit comprise a first limit that restricts a total quantity of passcodes associated with the account, wherein the first limit comprises a randomly generated value.

8. The method of claim 7, wherein the respective randomized resource limit further comprise a second limit that restricts a quantity of a second computing resource associated with the one of the second passcodes, wherein the second computing resource comprises one or more of a storage space, a processing power, or a network bandwidth, wherein the second limit comprises a randomly generated value.

9. A system comprising:
   a memory;
   a processing device operatively coupled to the memory, the processing device to:
   access an account that is associated with a set of computing resources and comprises a first passcode and a plurality of second passcodes, wherein the account is associated with a limit to a number of passcodes and wherein the first passcode enables access to the set of computing resources and wherein the plurality of second passcodes enable constrained access to the set of computing resources;

associate the plurality of second passcodes with respective randomized resource limit that restrict a number of sub passcodes that can be created, wherein the respective randomized resource limit comprise different values that are each less than the limit for the account;

receive a first request to create a sub passcode, wherein the first request is associated with one of the second passcodes having constrained access;

deny the first request in response to a first attempt to create the sub passcode associated with one of the second passcodes in excess of the respective randomized resource limit;

receive, from a computing thread, a second request to create a passcode for the account; and deny the second request to create the passcode in response to a second attempt to create the passcode for the account in excess of the respective randomized resource limit, wherein the computing thread is unable to determine a value for the respective randomized resource limit.

10. The system of claim 9, further comprising the processing device to establish a first connection and a second connection in view of the account, wherein the first connection is in view of the first passcode and is associated with unconstrained access to the set of computing resources and wherein the second connection is in view of one of the second passcodes and is associated with constrained access to the set of computing resources.

11. The system of claim 10, wherein the first connection and the second connection each comprise a login session for at least one of a web service, an operating system, or an application.

12. The system of claim 10, wherein the set of computing resources comprises a computing resource that is hidden from the second connection associated with the constrained access and is accessible to the first connection associated with the unconstrained access.

13. The system of claim 9, wherein the first passcode and the plurality of second passcodes enable a respective computing thread to request a creation of an additional passcode.

14. A non-transitory machine-readable storage medium storing instructions that cause a processing device to:

generate a plurality of passcodes for an account that is associated with a limit to a number of passcodes, the plurality of passcodes comprising a first passcode that enables access to a set of computing resources and a plurality of second passcodes that provide constrained access to the set of computing resources;

establish a connection for a computing thread in view of the account and one of the second passcodes, wherein the computing thread is unable to detect an existence of the first passcode of the account;

associate the plurality of second passcodes with respective randomized resource limit that restrict a number of sub passcodes that can be created, wherein the respective randomized resource limit comprise different values that are each less than the limit for the account;

receive, over the connection, a first request to create a sub passcode, wherein the first request is associated with one of the second passcodes having constrained access for the account;

deny the first request in response to a first attempt to create the sub passcode associated with one of the second passcodes in excess of the respective randomized resource limit, wherein a value of the respective randomized resource limit is inaccessible to the computing thread;

receiving, from the computing thread, a second request to create a passcode for the account; and denying the second request to create the passcode in response to a second attempt to create the passcode for the account in excess of the respective randomized resource limit, wherein the computing thread is unable to determine a value for the randomized resource limit.

15. The non-transitory machine-readable storage medium of claim 14, wherein the connection comprises a login session for at least one of a web service, an operating system, or an application.

16. The non-transitory machine-readable storage medium of claim 14, wherein the set of computing resources comprises a computing resource that is hidden from a computing thread using a connection comprising the constrained access and is accessible to a computing thread using a connection comprising unconstrained access.

17. The non-transitory machine-readable storage medium of claim 14, wherein the first passcode and the plurality of second passcodes permit a respective computing thread to request a creation of an additional passcode.

18. The non-transitory machine-readable storage medium of claim 14, wherein the respective randomized resource limit comprises a first limit that restricts a total quantity of passcodes associated with the account.

19. The non-transitory machine-readable storage medium of claim 14, wherein the respective randomized resource limit further comprises a second limit that restricts a quantity of a second computing resource associated with the connection, wherein the second computing resource comprises one or more of a storage space, a processing power, or a network bandwidth, wherein the second limit comprises a randomly generated value.

* * * * *